(12) United States Patent
Hart (10) Patent No.: US 7,926,413 B2
(45) Date of Patent: Apr. 19, 2011

(54) BEVERAGE SERVER WITH A DRIP TRAY ASSEMBLY

(75) Inventor: Burton L. Hart, Auburn, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 343 days.

(21) Appl. No.: 11/751,448

(22) Filed: May 21, 2007

(65) Prior Publication Data

US 2007/0266861 A1 Nov. 22, 2007

Related U.S. Application Data

(60) Provisional application No. 60/747,751, filed on May 19, 2006.

(51) Int. Cl.
*A47J 31/00* (2006.01)
*B67D 1/16* (2006.01)

(52) U.S. Cl. ........ 99/279; 399/306; 222/108; 222/185.1

(58) Field of Classification Search .................. 222/108, 222/185.1; D7/306; 99/279, 306
See application file for complete search history.

(56) References Cited

U.S. PATENT DOCUMENTS

| 4,944,332 | A | * | 7/1990 | Belland | 141/1 |
| 5,305,924 | A | * | 4/1994 | Groover et al. | 222/129.1 |
| D464,226 | S | * | 10/2002 | Lassota et al. | D7/306 |
| 6,619,507 | B2 | | 9/2003 | Lassota | |
| 6,708,598 | B2 | * | 3/2004 | Lassota | 99/279 |
| 6,820,771 | B2 | * | 11/2004 | Lassota et al. | 222/185.1 |
| 6,884,452 | B1 | * | 4/2005 | Lassota | 426/431 |

* cited by examiner

*Primary Examiner* — Stephen J Ralis
(74) *Attorney, Agent, or Firm* — Barnes & Thornburg LLP (57) ABSTRACT

A beverage server assembly and a base for elevating a beverage container. The beverage server assembly includes the base including extensions and a connecting portion defining a nesting area therein. The nesting area defines an opening. A drip tray assembly can be removably retained in the nesting area. The drip tray assembly includes a drip tray with a removable grate. The nesting area is sized in dimension for use with the drip tray assembly or with the grate without the drip tray. The server assembly can be positioned with the faucet extending over a drain to allow liquid to flow from the faucet to the grate, through the opening and to the drain without collection in the drip tray.

17 Claims, 8 Drawing Sheets

BEVERAGE SERVER WITH A DRIP TRAY ASSEMBLY

CROSS-REFERENCE TO RELATED APPLICATION

This patent application claims the benefit of priority under 35 U.S.C. §119(e) to U.S. Provisional Patent Application No. 60/747,751 filed May 19, 2006. The disclosure set forth in the referenced provisional application is incorporated herein by reference in its entirety, including all information as originally submitted to the United States Patent and Trademark Office.

BACKGROUND

This disclosure generally relates to beverage servers and assemblies for retaining drip trays or grates associated with a beverage server assembly.

A variety of prior art devices have been developed to support a container for retaining a volume of beverage in a position elevated from a work surface so as to facilitate placement of a cup underneath a dispensing faucet attached to the container. Such beverage dispensing server assemblies have been useful in allowing a beverage to be brewed, retained, and removed to a location remote from the brewer. For example, the server can be positioned relative to a beverage brewing device or other dispensing device to receive the beverage therein. In an example with a heated beverage, the container can be formed of a dual wall thermal structure or any other of a variety of thermally insulating containers. The beverage dispensed into the container can then be moved to another location such as a serving station.

In restaurants or other food service settings, it may be desirable to position server assemblies at satellite locations to allow the consumer to have easy access to these servers. Additionally, in a coffee house or restaurant environment, it may be desirable to brew several different flavors or types of coffee or tea and retain the coffee or tea in thermal servers for subsequent dispensing. This allows a single brewer to provide multiple batches of beverage over a period of time and retention of those beverages for later dispensing.

As noted above, it may be desirable to position the faucet at an elevated position so that the cup may be placed under the faucet for dispensing. A variety of prior art drip tray assemblies have been developed to collect beverage which might spill or to collect drips which may occur after the cup is removed. For example, at the end of a dispensing period, the user may not cleanly terminate the use of the faucet and a drip may occur. Additionally, over time, faucet components may wear and the faucet may leak and drip. As such, it is desirable to provide a tray which will collect such drips. The prior art drip trays have included trays which are directly and permanently attached to servers, trays which include sponges, and other trays which might be removable.

Prior to the development of the present design, it is not known that any tray assembly has been developed as taught by the disclosure herein. The disclosed server and drip tray assembly provide structures and functions which improve upon the prior art to provide enhanced functionality.

The exemplification in the disclosure illustrates embodiments that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

Figure 1:
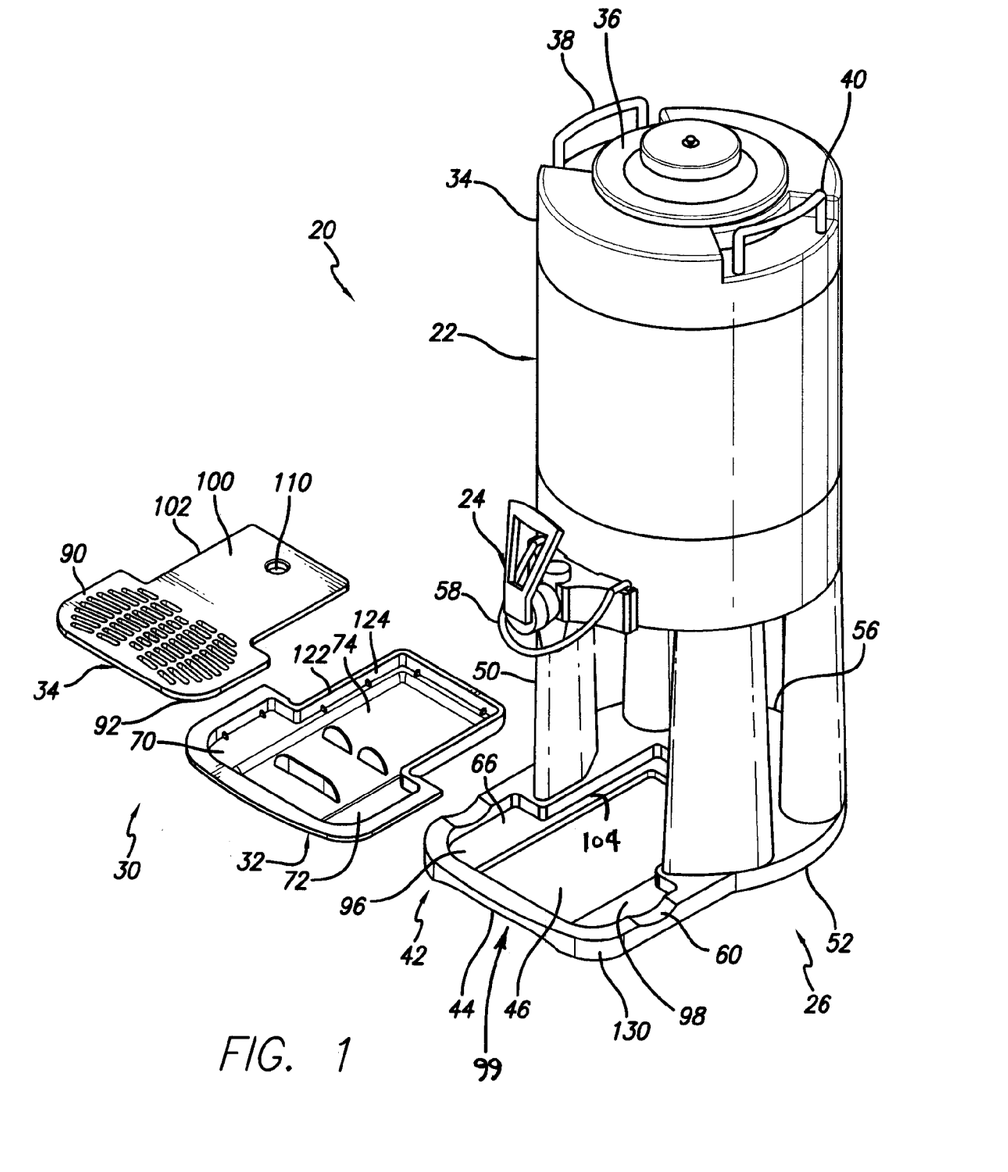
FIG. 1 is an exploded perspective view of a server assembly including a container having a dispensing faucet with a base positioned underneath the container, a drip tray assembly is shown exploded away from a recessed area on the base, the drip tray assembly includes a drip tray and a grate.

With reference to FIG. 1, a server assembly 20 is shown in perspective view. The server assembly 20 includes a container 22 having a faucet 24 attached thereto. The container 22 is positioned on a base 26 to elevate the faucet 24 above the surrounding surface. A drip tray assembly 30 includes a drip tray 32 and a grate 34 which can be positioned over the drip tray 32.

The container 22 is of a type which can be used to retain beverage. Beverage is dispensed through an opening at a top portion 34 of the container 22. Although an opening in the top portion 34 is not shown, a lid 36 is shown covering the top opening. Top side handles 38, 40 are provided to aid in moving and/or positioning the server assembly 20.

The base 26 includes a recessed portion 42 providing a front hand grip 44 thereon. The recessed portion 42 is designed to retain the drip tray assembly 30. An opening 46 is defined in the recessed portion 42. The base also includes at least one and, as illustrated, a plurality of vertical extensions or pillars 50 spaced on a base foot 52. The pillars 50 extend upwardly from a foot 52 to support the container 22.

The server assembly 20 provides many different locations for gripping. For example, the top side handles 38, 40 provide one gripping area. A front hand grip 44 is provided on the recessed portion 42 and a rear grip 56 is provided on the rear of the foot 52. A handle 58 is provided surrounding the faucet and also protects the faucet from accidental impact. Additionally, a user can grip the pillars 50 to help facilitate moving the server 20.

A natural tendency in moving the server assembly 20 is to grip the front hand grip 44 and one of the top handles 38, 40. This grip is a grip which allows a user to extend between two relatively distant gripping areas providing maximum support and control. The single handle, generally centrally positioned provides significant stability when handling the Server. The handle also helps reduce or eliminate using the handle near the faucet. While the faucet handle can be used to move the Server, using the single recessed area handle reduces the chances of bumping the faucet while handling the Server. Also, it is useful to grip the front hand grip 44 when lifting the server assembly 20 off of a surface. The hand grip 44 is recessed under the structure of the recessed portion so as to prevent bumping the drip tray assembly which is retained in the recessed portion. Side notches 60 are provided to allow user to obtain a grip to lift the drip tray assembly out of the recessed portion 42 when necessary.

Figure 4:
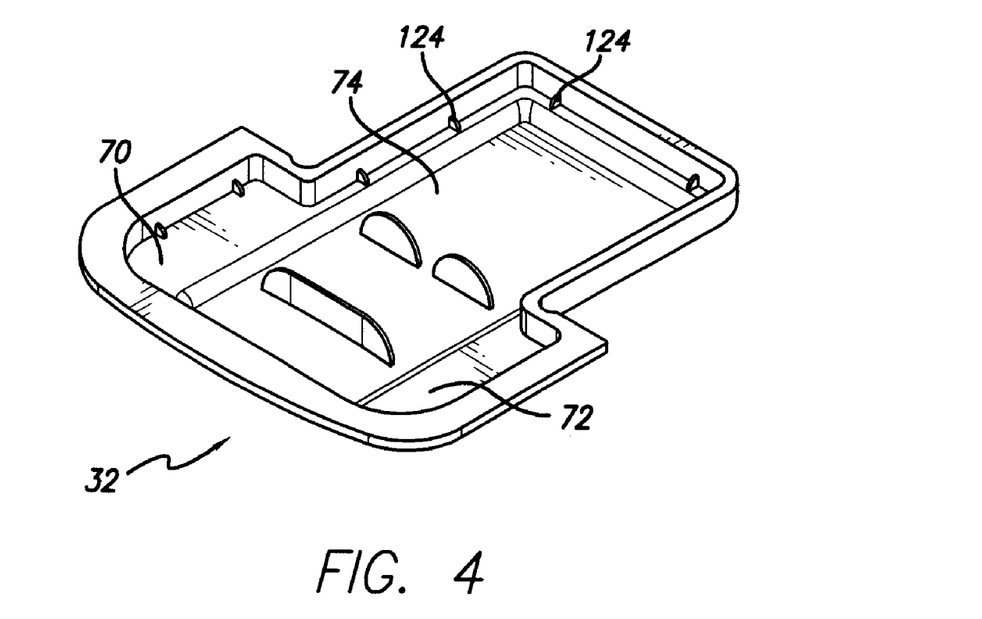
FIG. 4 is an enlarged perspective view of the drip tray with the grate removed therefrom.

With regard to the recessed portion 42 and drip tray 30, the drip tray 32 is sized and dimensioned to fit into the recessed portion 42. The drip tray 32, grate 34 and nesting area 66 of the recessed portion 42 are cooperatively formed in a "T" shape. While the "T" shape helps facilitate proper orientation of the drip tray assembly 30 in the recessed portion 42, the shape also derives from the design of the recessed portion 42. One of the design considerations of the present server assembly 20 is to minimize the forward extension of the recessed portion 42 from the foot 52. This, as will be explained below, is to provide additional functionality of the server assembly 20. However, the drip tray 32 needs to hold a predetermined volume of liquid. In order to accommodate the volume of liquid without making the drip tray too deep, side extensions 70, 72 were formed in the drip tray. In other words, the drip tray defines a cavity 74 with extensions that extend sideways away from a central area. By extending the drip tray 32 rearwardly between the pillars 50 additional volume can be retained for retaining liquid. It may be desirable to provide a volume in the cavity 74 which is greater than a predetermined volume of liquid so as to help minimize splashing or sloshing of liquid when moving the drip tray assembly 30. While a deeper drip tray could be used, to do so would take vertical space from the cup area under the faucet thereby reducing the possible range of cup sizes which could be used with the server.

Figure 2:
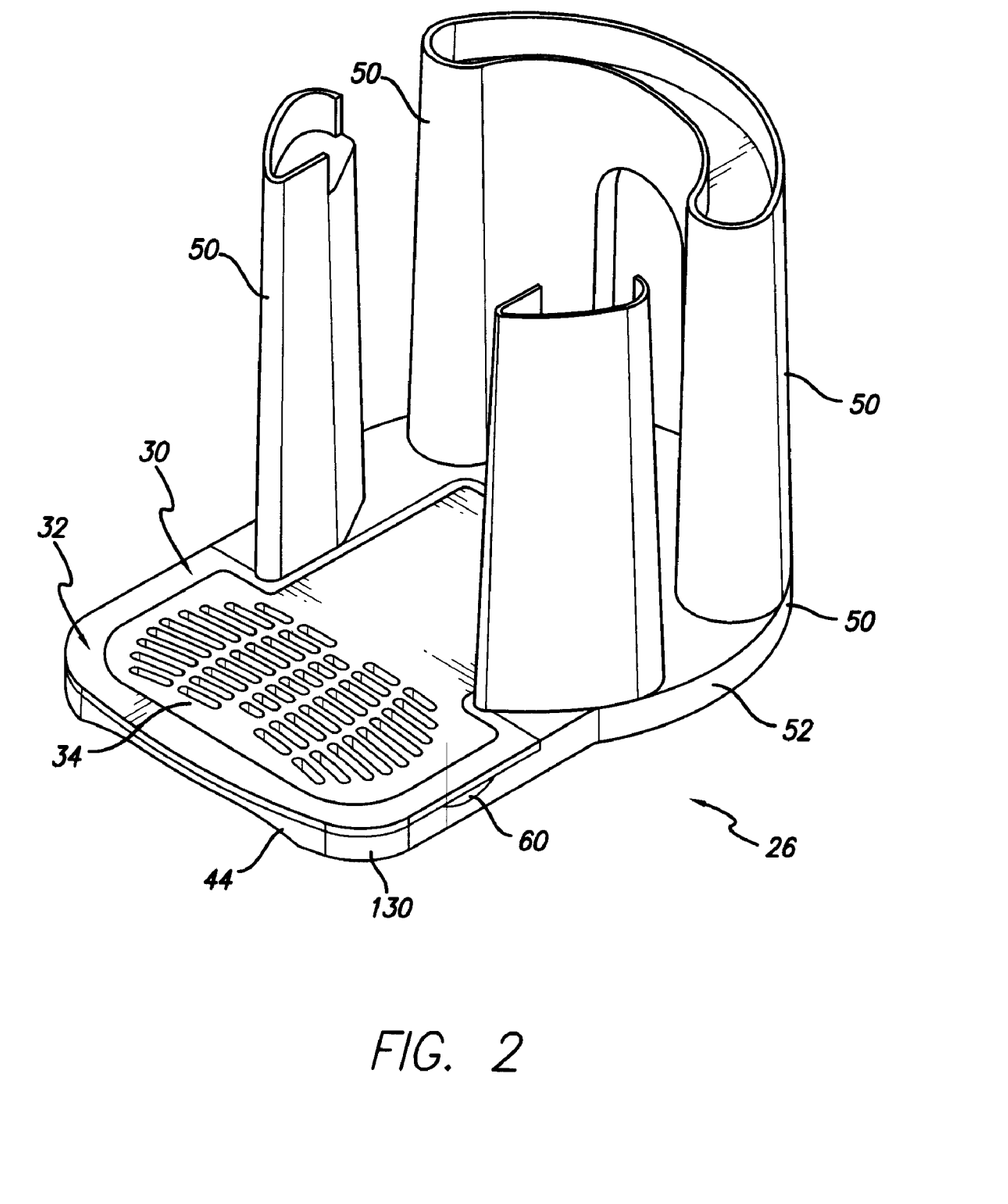
FIG. 2 is the perspective view of the drip tray assembly assembled and positioned on the base with the container portion removed from the base.
Figure 3:
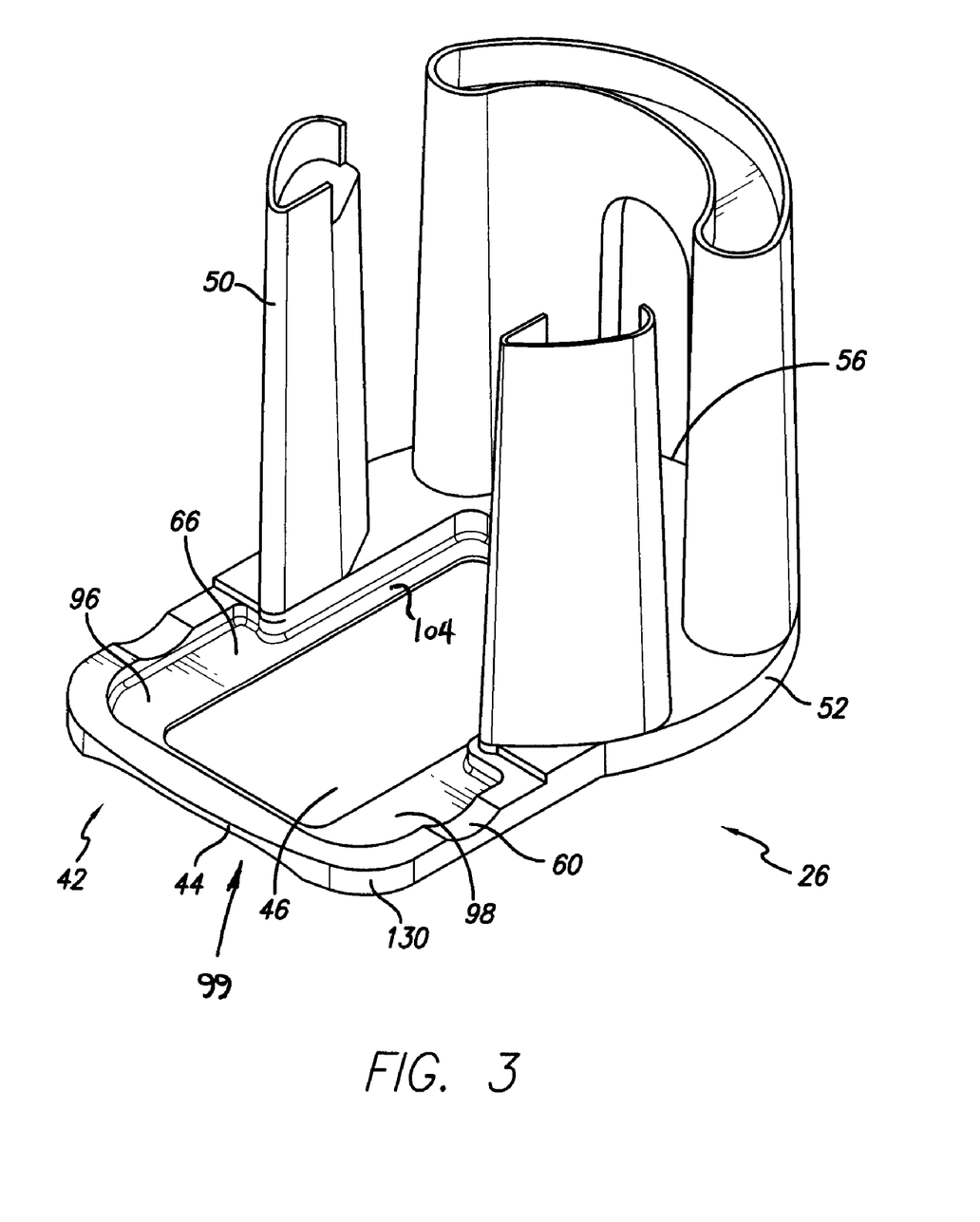
FIG. 3 is a perspective view of the base similar to that as shown in FIG. 2 and in which the drip tray assembly has been removed.
Figure 7:
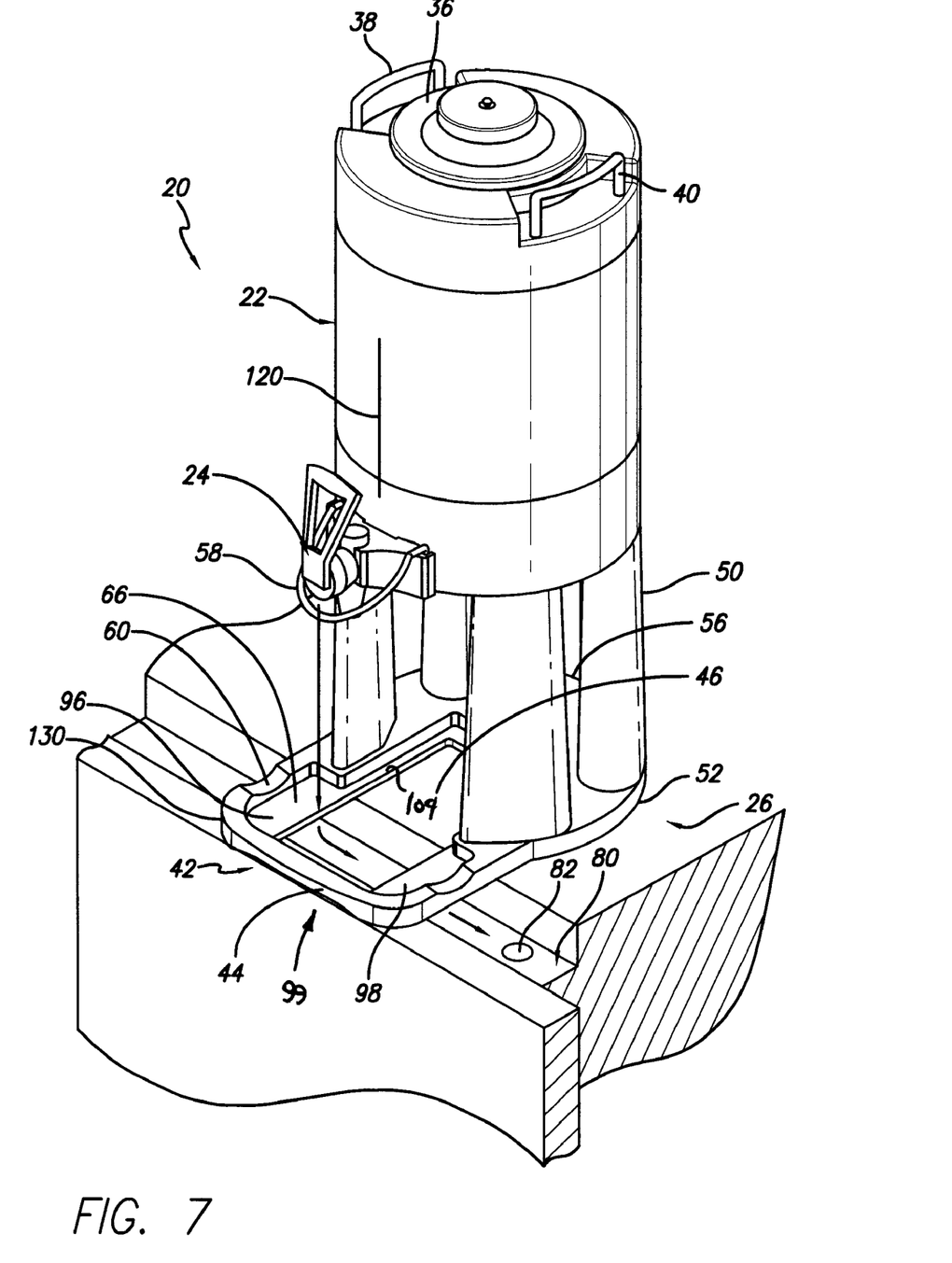
FIG. 7 is a perspective view of the server assembly positioned on the edge of a work surface in which the drip tray assembly has been removed from the server assembly to facilitate dispensing of beverage from the faucet and the collection of any drips or spills in a gutter or drain structure provided in the work surface, a unitary drip tray retaining recess portion extending forwardly of the base to provide support for the grate and a cup or container positioned on the grate for straddling the gutter or collection drain.
Figure 8:
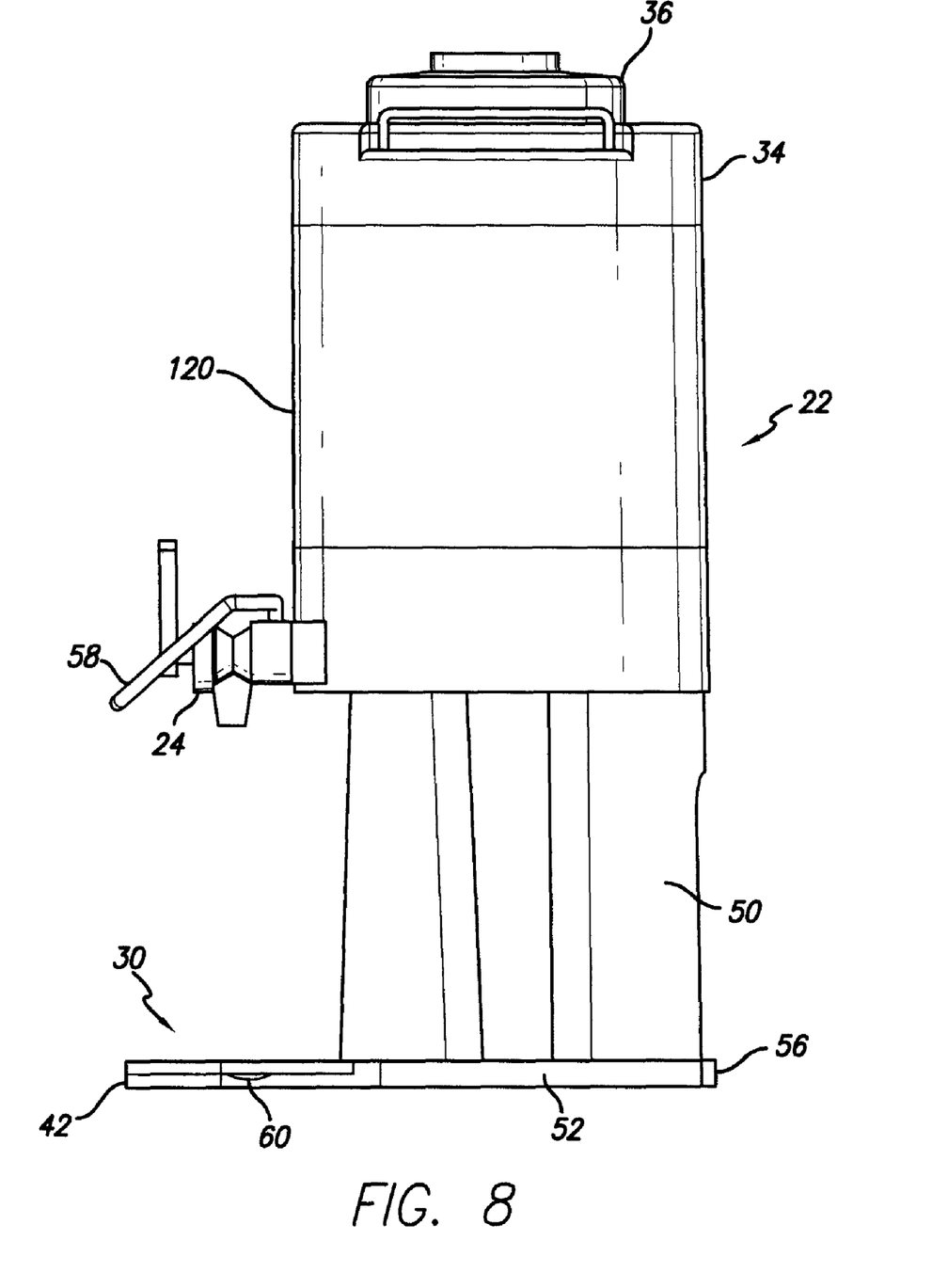
FIGS. 8, 9 and 10 show elevational views of the assembled server assembly with a faucet position thereon showing relative proportions and locations of the various structures described in the preceding drawings.
Figures 9, 10:
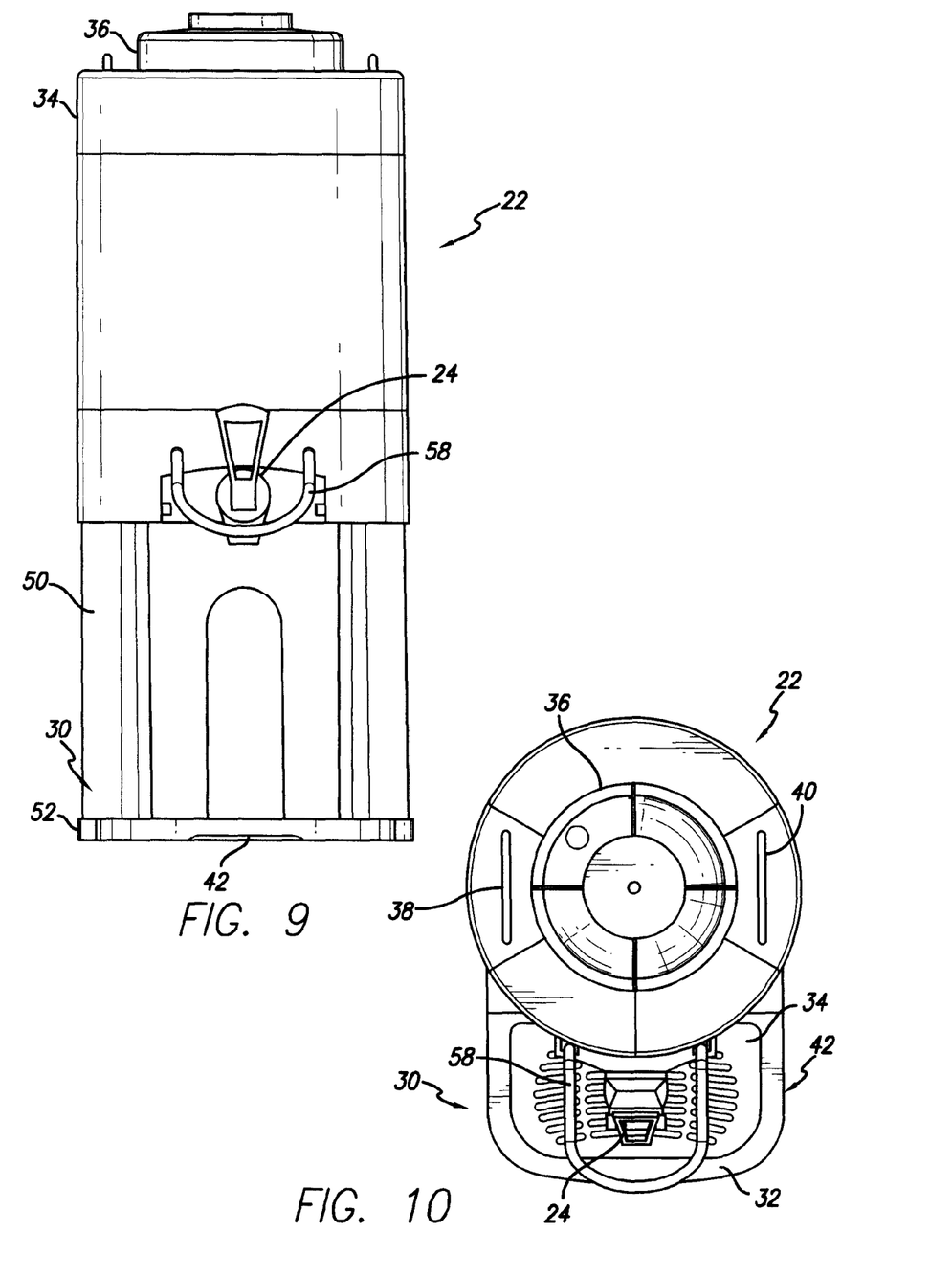

When assembled, the drip tray assembly 32 is positioned in the nesting area 66 of the recessed portion 42. With reference to FIG. 2, the container 22 has been removed to highlight the base 26. In FIG. 3, the drip tray assembly has been removed. It can be seen that the grate 34 is sized and dimensioned to fit into the nesting area 66 when the drip tray 30 has been removed. With reference to FIG. 7, the ability to place the grate 34 in the nesting area 66 allows the grate to be used in the absence of the drip tray. This can be useful in a setting in which a countertop or surface includes a service gutter 80 including or solely with a drain 82. Such a work surface may be found, by way of example but not limitation, in food institutions. In these settings, it may be desirable to remove the drip tray and just allow liquid that spills or drips from the faucet 24 to fall directly into the gutter or drain 80, 82. However, by designing the grate 34 to fit in the nesting area 66, the grate can still provide support for a cup positioned underneath the faucet. This eliminates having to hold the cup over the drain or gutter and provides the ability to drain liquid directly to the drain.

Figure 5:
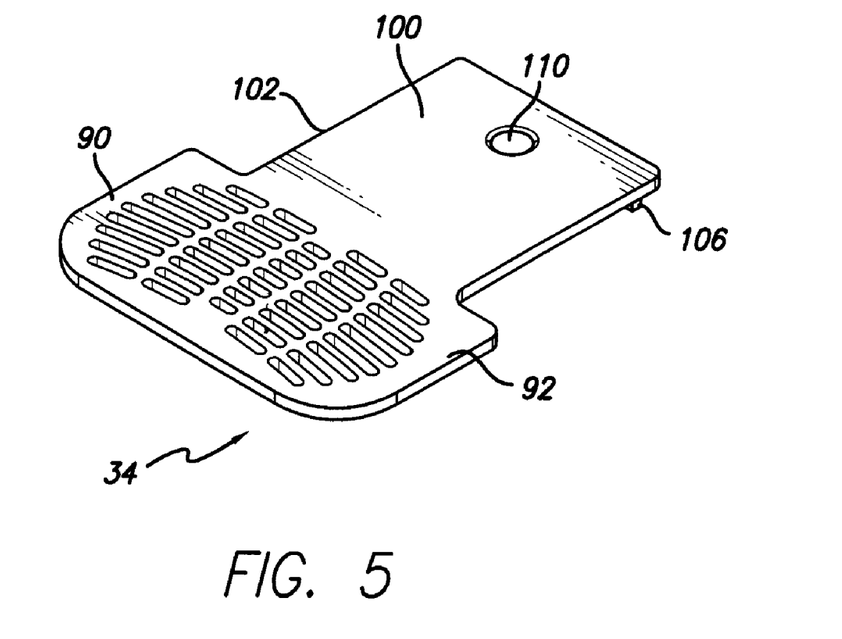
FIG. 5 is a perspective view of the grate.
Figure 6:
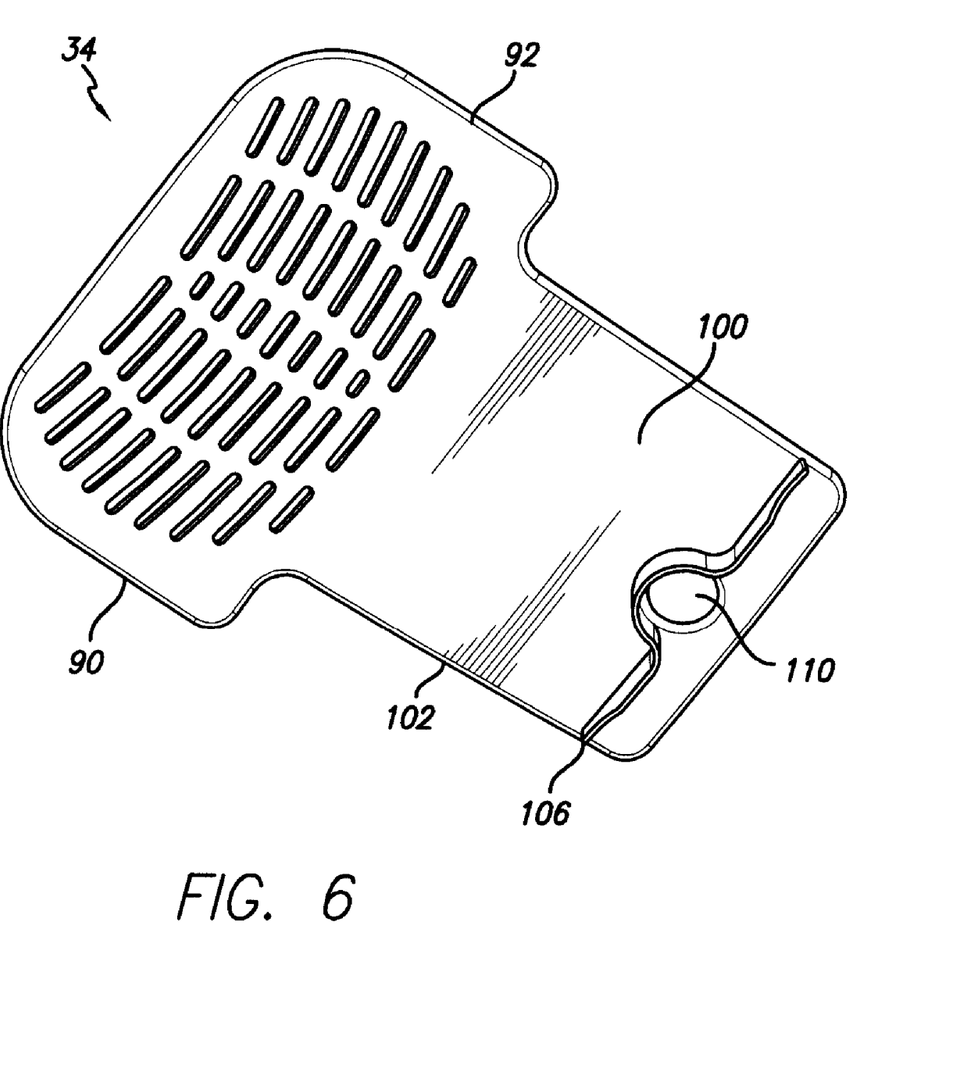
FIG. 6 is a bottom perspective view of the grate showing an elevated rib thereon.

When the grate 34 is used without the drip tray 32, the outer extensions 90, 92 fit into corresponding extension areas 96, 98 and connecting portion 99 defining a closed perimeter 130 of the nesting area 66. The rearward extension 100 of the grate 34 extends between the pillars 50. While the edges 102 are generally supported by corresponding flanges 104, a rearwardly most positioned portion of the grate 34 is also supported by corresponding rib 106 on the bottom of the grate (see FIG. 6). A finger hole 110 is provided on the grate to facilitate removal of the grate.

The overall design of the base 26 results in the foot 52 primarily carrying the weight of the container 22 and its contents. The wide footprint of the foot 52 helps facilitate stable positioning of the server assembly 20 on a surface. The recessed portion 42 generally provides support for the drip tray assembly 30 and provides little, if any, support for the container 22. The recessed portion 42 has been sufficiently designed to allow it to serve as a handle 44 for use in moving the server assembly 20. The forward extension of the recessed portion away from the foot 52 has been minimized so as to better accommodate the use in a drain environment such as that as shown in FIG. 7. A significant forward extension of the recessed portion 42 would cause it to extend beyond the edge of the work surface in which the drain 80 is formed. By minimizing the forward extension, the server is safer such that it reduces the risk of being bumped when it is positioned on such a surface. The forward extension of the recessed area from a front surface 120 of the container to the outer edge of the hand grip 44 is approximately 3¾ inches. This dimension in combination with the extension areas 70, 72 also provides a pleasing aesthetic in proportion to the server assembly 20. Additionally, most cup sizes can be accommodated on this drip tray and grate configuration. It should be noted that these dimensions can be adjusted as necessary to maintain these desirable proportions but that these dimensions are characteristic of a server having a container 22 with an outside diameter of 9 inches.

The overall design of the server assembly 20 eliminates gaps, passages and pockets which might otherwise accumulate moisture or particles. In this regard, no latches or mechanical mechanisms are required in order to position the drip tray assembly 30 on the recessed portion 42. The configuration of the drip tray 32 nests in the keyed orientation in the nesting area 66 of the recessed portion 42. Similarly, the grate 34 is positioned in the cavity 74 retained by an upward extending lip 122 on top of corresponding spaced apart protrusions 124. This configuration of the drip tray assembly 30 and of the server assembly 20 helps facilitate easy cleanup and does not require tools for disassembly and cleanup. The drip tray 32 and grate 34 can be removed from the recessed portion 42 and placed in a dishwasher for cleaning. Recessed portion 42 and nesting area 66 defines a keyed or shaped pocket for retaining the drip tray assembly 30. While a "T" shaped assembly is shown, geometries for the keyed assemblies could be provided to obtain the same function. The closed perimeter 130 of the recessed portion 42 helps hold the drip tray assembly 30 and does not provide any areas for moisture or other particles to accumulate.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the follow-

The invention claimed is:

1. A self-contained, freely movable server assembly including a container for containing a volume of beverage attached to a base, a faucet coupled to the container for dispensing beverage from the container to a vessel positioned below the faucet, the base vertically positioning the container above a corresponding surface on which the assembly is placed for use, the server assembly comprising:
   a unitary drip tray retaining portion extending forwardly from the base,
   forwardly protruding side extensions extending at least partially forwardly of the base and the container attached to the base, the side extensions being spaced apart,
   a connector structure extending between and connected to forward portions of each of the forwardly protruding side extensions,
   the forwardly protruding side extensions and the connector structure defining nesting area with an opening extending there through,
   recessed extension areas in the nesting area attached to each of the forward protruding side extensions and the corresponding portion of the connector structure, and
   a removable drip tray assembly retained in the nesting area, the removable drip tray including side extensions resting on and supported by the recessed extension areas in the nesting area.

2. A server assembly as set forth in claim 1, including a handgrip provided on the connector, handgrip defined on a recessed portion of the connector structure for use in moving the server assembly, the recessed portion defining the handgrip providing a clearance between the connector structure and a surface on which the server assembly is placed to allow a user to reach through the recessed area and lift the server assembly.

3. The server assembly of claim 1, further comprising the nesting area defining an opening there through.

4. The server assembly of claim 1, further comprising the drip tray assembly being positioned in the nesting area for receiving liquid from the faucet and providing a cavity defined therein for collecting and retaining liquid from the faucet.

5. The server assembly of claim 1, further comprising the extensions and connecting portion defining the nesting area, the opening being defined in the nesting area at least partially aligned with the faucet extending from the container, alignment of the faucet with the opening allowing liquid to flow from the faucet through the opening when the drip tray is not present with the connector structure and the forwardly protruding side extensions being sized and dimensioned to not interfere with the generally vertical path of flow from the faucet through the opening in the nesting area.

6. The server assembly of claim 5, further comprising the drip tray assembly including a removable drip tray and a grate retainable thereon, with the drip tray assembly being removable from the nesting area, the nesting area being configured to receive the grate without the drip tray thereunder to facilitate passage of liquid from the faucet, through the grate and opening.

7. The server assembly of claim 1, further comprising the drip tray assembly including a drip tray and a grate removably retainable on the drip tray, the drip tray being retained in the nesting area with the grate being retained in the drip tray.

8. The server assembly of claim 7, further comprising the grate being removable from the drip tray.

9. The server assembly of claim 8, further comprising a finger hole provided on the grate for gripping and removing the grate from the drip tray.

10. A self-contained, freely movable server assembly including a container for containing a volume of beverage attached to having a controllable dispensing faucet attached thereto and a base attached to the bottom of the container, the base defining forwardly protruding side extensions extending at least partially forwardly of the base and the container attached to the base, the side extensions being spaced apart, and a connector structure extending between and connected to forward portions of each of the forwardly protruding side extensions, the forwardly protruding side extensions and connector structure defining a nesting area there between, an opening being defined in the nesting area at least partially aligned with the faucet positioned there above, recessed extension areas in the nesting area attached to each of the forward protruding side extensions and a corresponding portion of the connector structure, and a drip tray assembly being removably retained within the nesting area, the removable drip tray including side extensions resting on and supported by the recessed extension areas in the nesting area, wherein liquid from the faucet passes though the opening when the drip tray is removed from the nesting area.

11. The server assembly of claim 10 further comprising, at least one handle provided on the container.

12. The server assembly of claim 10 further comprising, at least one handle defined on a recessed portion of the connector structure for use in moving the server assembly, the recessed portion defining the handle providing a clearance between the connector structure and a surface on which the server assembly is placed to allow a user to reach through the recessed area and lift the server assembly.

13. The server assembly of claim 12 further comprising, a grip provided on a rear portion of the base generally opposite the handle portion.

14. A base for use with a self-contained, freely movable beverage container to generally vertically elevate the beverage container above a surrounding surface on which it is placed, a faucet attached to the container for controllably dispensing beverage from the container, the base comprising: a foot, at least one extension extending generally upwardly from the foot, a pair of spaced apart forwardly protruding side extensions extending generally forwardly from each side of the foot with a connector structure connected to forward portions of each of the forwardly protruding side extensions, a nesting area defined between the foot, the forwardly protruding side extending portions, and the connector structure, a drip tray assembly removably retainable in the nesting area and at least partially extending forwardly of the base, and an opening defined extending though at least a portion of the nesting area and aligned with the faucet, recessed extension areas in the nesting area attached to each of the forward protruding side extensions and the corresponding portion of the connector structure, the removable drip tray including side extensions resting on and supported by the recessed extension areas in the nesting area, wherein liquid from the faucet passes though the opening when the drip tray is removed from the nesting area.

15. A base as set forth in claim 14 further comprising, a container retainable thereon.

16. A base as defined in claim 14 further comprising, the drip tray assembly including a drip tray and a grate, the drip tray assembly being removable from the nesting area with the grate being removable from the drip tray.

17. The server assembly of claim 14, further comprising the drip tray assembly including a removable drip tray and a grate retainable thereon, with the drip tray assembly being removable from the nesting area, the nesting area being configured to receive the grate without the drip tray thereunder to facilitate passage of liquid from the faucet, through the grate and opening.

* * * * *